United States Patent
Leshay et al.

(10) Patent No.: US 6,286,125 B1
(45) Date of Patent: Sep. 4, 2001

(54) METHOD AND SYSTEM FOR GENERATING AND TRANSFERRING ERROR DETECTION INFORMATION OVER A BUS

(75) Inventors: Bruce A. Leshay, West Boylston; Dana Hall, Hopkinton, both of MA (US); Jim McGrath, Mountain View, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/259,746

(22) Filed: Feb. 27, 1999

(51) Int. Cl.$^7$ ..................................... G06F 11/10
(52) U.S. Cl. ............................. 714/807; 714/56
(58) Field of Search .................. 714/52, 56, 807, 714/805

(56) References Cited

U.S. PATENT DOCUMENTS

| | | | |
|---|---|---|---|
| 4,346,474 | * | 8/1982 | Sze .......................................... 371/49 |
| 4,511,963 | * | 4/1985 | Kantner ................................ 364/200 |
| 4,792,898 | * | 12/1988 | McCarthy et al. ................... 364/200 |
| 5,506,958 | * | 4/1996 | Myran .............................. 395/182.16 |
| 5,784,390 | * | 7/1998 | Masiewicz et al. .............. 371/40.11 |
| 5,928,375 | * | 7/1999 | Lucas et al. .......................... 714/752 |

* cited by examiner

Primary Examiner—Stephen M. Baker
(74) Attorney, Agent, or Firm—Michael Zarrabian

(57) ABSTRACT

A method of providing error detection information for data transferred between a sender and a receiver interconnected via a bus in a data communication system. The sender transmits data to the receiver on the bus, generates error detection information for the transmitted data, transmits a notification signal to the receiver to indicate start of error detection information transfer, and transmits the error detection information to the receiver on the bus. The receiver generates error detection information for data received from the sender, and compares the receiver generated error detection information to error detection information received from the sender, posting an error condition in case of one or more mismatches.

54 Claims, 14 Drawing Sheets

CRC TIMING

- ASYNCHRONOUS, WIDE BUS
- DIRECTION: DOESN'T MATTER, PROTOCOL IS SYMMETRICAL

CRC TIMING

- ASYNCHRONOUS, WIDE BUS
- DIRECTION: DOESN'T MATTER, PROTOCOL IS SYMMETRICAL

CRC TIMING

- SYNCHRONOUS, WIDE BUS, SINGLE EDGE CLOCKING
- DIRECTION: TARGET TO INITIATOR

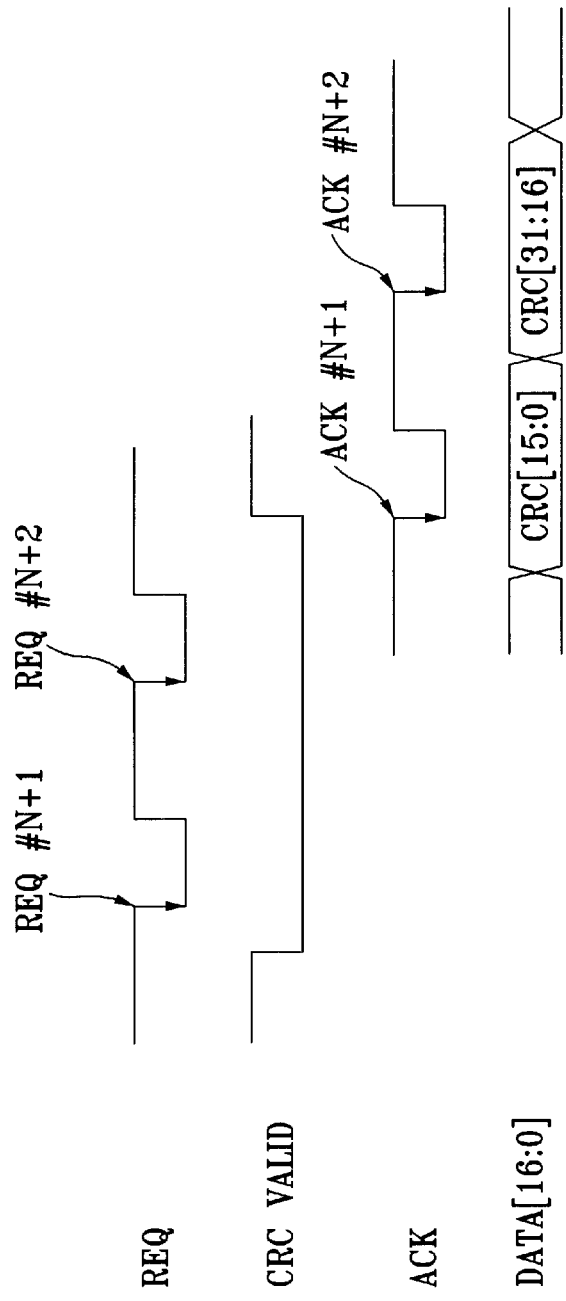

METHOD AND SYSTEM FOR GENERATING AND TRANSFERRING ERROR DETECTION INFORMATION OVER A BUS

FIELD OF THE INVENTION

The present invention relates to data communication between senders and receivers over a bus, and in particular to transferring error detection information for data transmitted between senders and receivers over a bus.

BACKGROUND

In many data communication systems, data sender and receiver devices are interconnected via a bus and data is transferred between those devices over the bus by a predetermined communication protocol. However, due to noise and protocol errors, not all of the data transmitted from a sender to a receiver is always received error free. To provide error detection and error correction, many conventional data communication systems utilize communication protocols wherein individual data bytes transmitted from a sender to a receiver over a data bus are provided with parity bits.

However, a parity bit for a data byte only protects against single-bit errors in the data byte. If there are two or more bit errors in the data bytes, the parity bit does not provide information for detecting and correcting those errors. Further, a parity bit scheme do not provide any error protection for a stream of data bytes transmitted from a sender to a receiver. Nor does a parity bit scheme provide any protection for protocol errors in which an entire data byte or word is dropped or repeated. For example, in a communication system utilizing a SICS bus protocol, handshake signals between a sender and a receiver are used to clock the bus in asynchronous mode. However, noise on the handshake signals can cause their misinterpretation at the receiver, and result in either missing or double clocking whereby data bytes are lost or repeated.

Conventional error detection schemes for alleviating the above shortcomings require substantial changes in existing data communication protocols in order to provide error detection for data transmitted from a sender to a receiver. For example, the SCSI bus protocol is primarily utilized for communication between an initiator device, such as host device, and several target devices, such as peripheral storage devices. The SCSI protocol is "target driven" wherein each target device determines the bus phase and direction of data transfer from the target to the initiator, or from the initiator to the target. Convention error detection schemes for the SCSI bus protocol either require changing the nature of the SCSI protocol from "target driven" to "initiator driven", or require both the target and the initiator to know the nature and location of error detection information for the data transmission in advance of transmission over the bus.

There is, therefore, a need for a method of adding error detection information to data transferred between a sender and a receiver over a bus, which provides protection for multiple data bit errors. There is also a need for such a method to provide error detection protection for a stream of data. There is also a need for such a method to not require a change in the data communication protocol over the bus such as in a SCSI bus protocol.

SUMMARY

The present invention satisfies these needs. In one embodiment, the present invention provides a method of providing error detection information for data transfer in a data communication system including a sender device and a receiver device interconnected via a bus, such as a SCSI bus. According to an embodiment of the present invention, the sender: (1) transmits data to the receiver on the bus, (2) generates error detection information for the transmitted, (3) transmits a notification signal to the receiver to indicate start of error detection information transfer, and (4) transmits the error detection information to the receiver on the bus. The notification signal allows the receiver to distinguish the error detection information from the transmitted data, and identify the error detection information corresponding to the transmitted data. The receiver generates error detection information for data received from the sender, and compares the receiver generated error detection information to the error detection information received from the sender. If there are one or more mismatches, the receiver posts an error condition. The sender and the receiver utilize the same process for generating error detection information, such as a multi-bit cyclic redundancy check (CRC) sum for the transmitted data.

In a data communication system comprising a peripheral device and a host device coupled to a bus, the host device and the peripheral device can utilize asynchronous or synchronous transmission protocols for exchange of information over the bus. In one embodiment, the transmission protocol can be symmetric wherein the protocol for data transfer from the host device to the peripheral device over the bus is the same as the protocol for data transfer from the peripheral device to the host device. In the former case the host device is the sender and the peripheral device is the receiver, and in the latter case the peripheral device is the sender and the host device is the receiver.

For either case, in asynchronous mode the protocol comprises an interlock handshaking routine including the steps of: for each data unit, the sender placing a data unit on the bus and transmitting a request signal to the receiver to signal the receiver of the data unit on the bus, and the receiver latching the data unit from the bus upon receiving the request signal and transmitting an acknowledge signal to the receiver. This interlock handshake is repeated for each data unit transmitted from the sender to the receiver in the asynchronous mode. After the sender transmits a desired number of data units to the receiver, the sender then transmits the error detection information units generated for the transmitted data. The sender and the receiver follow the same handshake interlock routine for transmission of error detection information units from the sender to the receiver over the bus. The notification signals inform the receiver that the information units received over the bus form error detection information for the data bytes transmitted from the sender to the receiver.

In synchronous mode, an interlocking handshake is not utilized. The sender sequentially places one or more data units on the bus and for each data unit transmits a corresponding request signal to the receiver to signal the receiver of the data unit on the bus. After transmitting a number data units upto a desired number, the sender begins transmitting the error detection information units to the receiver by sequentially placing the information units on the bus, and for each information unit, transmitting a corresponding request signal and a corresponding notification signal to inform the user that the information units are on the bus and are error detection data. The receiver sequentially latches each data unit from the bus in response to the corresponding request signal. Similarly, the receiver sequentially latches each information unit from the bus in response to the corresponding request signal, and later transmits an acknowledge signal to the receiver for each request signal received.

In another embodiment, the transmission protocol can be asymmetric wherein the protocol for data transfer from the peripheral device to the host device is different than that for data transfer from the host device to the peripheral device. In the former case the peripheral device is the sender and the host device is the receiver, and in the latter case the host device is the sender and the peripheral device is the receiver. In asynchronous mode for data transfer from the host device to the peripheral device, the protocol comprises an interlock handshaking routine including the steps of: the peripheral device transmitting a request signal to the host device requesting data, the host device transmitting data to the peripheral device on the bus in response to the request signal, the peripheral device transmitting a notification signal to the host device requesting error detection information for said data, the host device generating error detection information for said data, and the host device transmitting the error detection information to the peripheral device on the bus in response to the notification signal. The transmitted data comprises one or more data units such as bytes or words, and the error detection information comprises one or more units of information such as bytes or words. As such, the handshaking steps are repeated for each data unit and for each information unit. After receiving the requested data units, the peripheral device requests the host device to transfer the error detection information units for the transmitted data, and the host device transmits the error detection information over the bus.

In synchronous mode, an interlocking handshake is not utilized. The peripheral device sequentially transmits one or more request signals to the host device requesting one or more data units, the peripheral device transmits one or more notification signals to the host device requesting one or more error detection information units for said data units, the host device transmits one or more data units to the peripheral device on the bus in response to said request signals for data units, the host device generating one or more error detection information units for said data units, and the host device transmitting the error detection information units to the peripheral device on the bus in response to said notification signals for information units. For each data unit transmitted to the peripheral device, the host device transmits a corresponding acknowledge signal to the peripheral device, and for each information unit transmitted to the peripheral device, the host device transmits a corresponding acknowledge signal to the peripheral device. The peripheral device keeps a count of the number of acknowledge signals for identifying the corresponding data and information units based on their number and position in time as received by the peripheral device.

BRIEF DESCRIPTION OF THE DRAWINGS

These and other features, aspects and advantages of the present invention will become better understood with regard to the following description, appended claims and accompanying drawings where:

FIG. 14 shows example timing diagrams for synchronous wide bus transfer of four error code bytes from the initiator to the target after N words of data have been transferred, according to another aspect of the present invention.

DESCRIPTION

Figure 1:
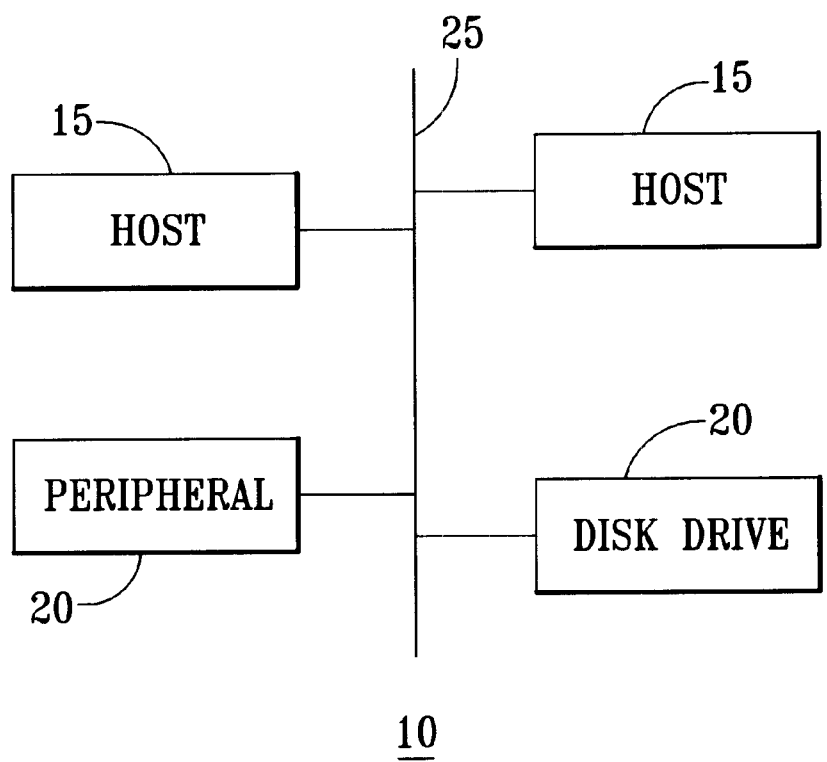
FIG. 1 shows a block diagram of the architecture of an example data communication system in which an embodiment of the method of the present invention can be implemented.
Figure 2A:
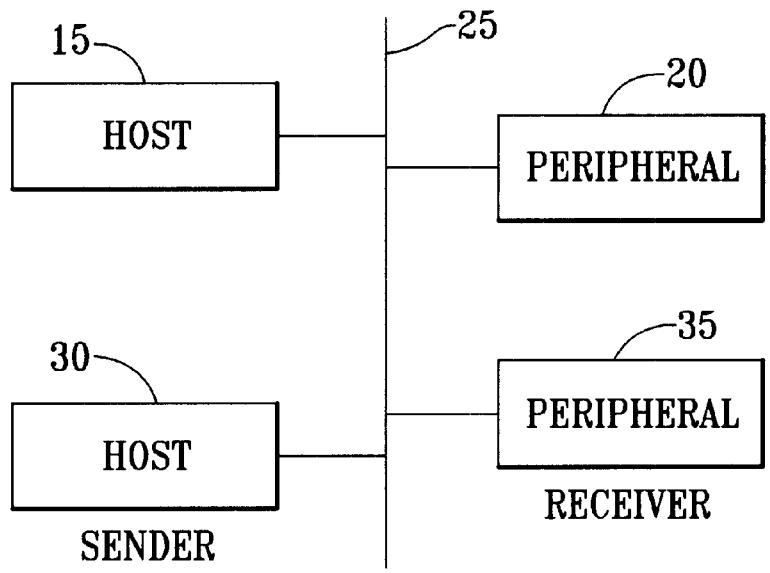
FIG. 2A shows a block diagram of the architecture of an example embodiment of the data communication system of FIG. 1, wherein the host device is a sender and the peripheral device is a receiver.
Figure 2B:
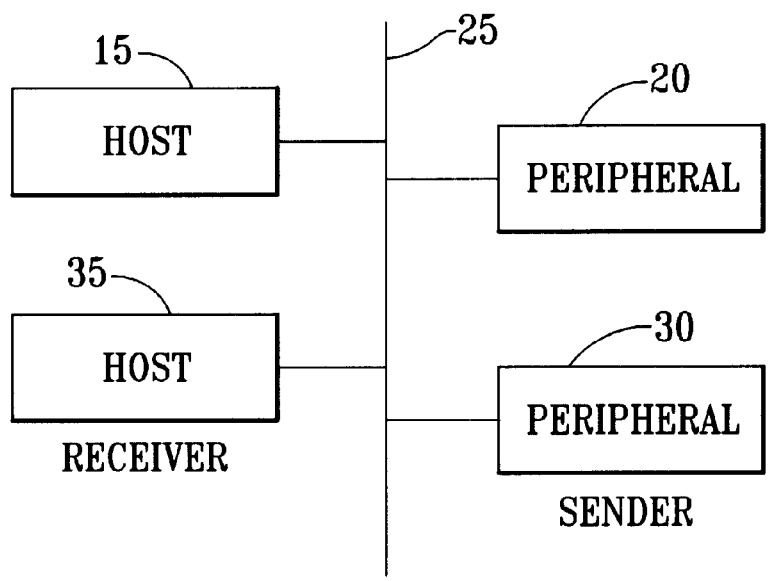
FIG. 2B shows a block diagram of the architecture of an example embodiment of the data communication system of FIG. 1, wherein the peripheral device is the sender, and the host device is the receiver.

FIG. 1 shows a block diagram of the architecture of an example data communication system 10 in which a method embodying aspects of the present invention can be implemented. The communication system 10 typically includes at least one host device 15 and one or more peripheral devices 20 such as disk or tape drives, interconnected via a bus 25. The host device 15 and each peripheral device 20 follow a communication protocol for communication and exchange of information over the bus 25. When the host device 15 transmits data to the peripheral device 20, the host device 15 is a sender and the peripheral device 20 is a receiver, and when the peripheral device 20 transmits data to the host device 15, the peripheral device 20 is the sender and host device 15 is the receiver. The communication protocol provides a set of conventions for transmission of data and information from the sender to the receiver over the bus. To simplify the description herein, FIG. 2A shows a block diagram of the architecture of an example embodiment of the data communication system 10 of FIG. 1, wherein the host device 15 is a sender 30, and the peripheral device 20 is a receiver 35. And, FIG. 2B shows a block diagram of the architecture of another example embodiment of the data communication system 10 of FIG. 1, wherein the peripheral device 20 is the sender 30, and the host device 15 is the receiver 35.

Figure 3:
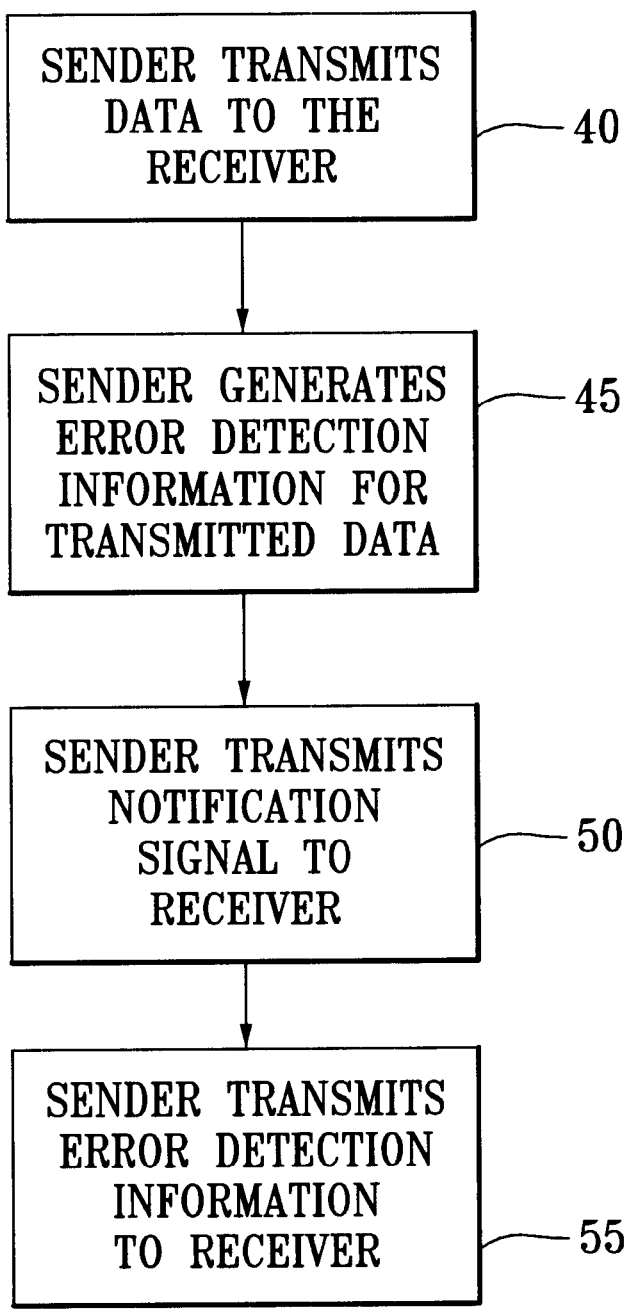
FIG. 3 shows an example flowchart of an embodiment of a method of adding error detection information to data transferred between a sender and a receiver over the bus in FIG. 1, according to the present invention.

Referring to FIG. 3, in one embodiment, the present invention provides a method of adding error detection information to data transferred between a sender 30 and a receiver 35 over the bus 25, comprising the steps of: the sender 30 transmitting data to the receiver 35 on the bus 25 (step 40); the sender 30 generating error detection information for the transmitted data (step 45); the sender 30 transmitting a notification signal to the receiver 35 to indicate start of error detection information transfer (step 50); and the sender 30 transmitting the error detection information to the receiver 35 on the bus 25 (step 55). In the embodiments described herein, the transmitted data comprises one or more data units, and the error detection information comprises one or more information units. Each data unit and each information unit can be a byte or a word, for example.

The error detection information covers all the data sent from the sender 30 to the receiver 35 since beginning of data transfer from the sender 30 to the receiver 35, or since the last set of error detection information was transmitted from the sender 30 to the receiver 35. The error detection information is generated by the sender 30 as the data is transmitted from the sender 30 to the receiver 35. In one embodiment, the error detection information can include a multi-bit cyclic redundancy check (CRC) sum for the transmitted data. The CRC algorithm can be one of many known to those skilled in the art. For example, the CRC algorithm can be a Fibre Channel 32-bit CRC algorithm. Further, the error detection information can be generated by any algorithm or function which provides error detection and correction information for the transmitted data.

The sender 30 and the receiver 35 can utilize asynchronous or synchronous transmission protocols, and the bus 25 can be a symmetric or an asymmetric bus. Referring to FIG. 1, if the bus is symmetric, the protocol for data transfer from the host device 15 to the peripheral device 20 over the bus 25 is the same as the protocol for data transfer from the peripheral device 20 to the host device 15. In the former case the host device 15 is the sender 30 and the peripheral device 20 is the receiver 35, and in the latter case the peripheral device 20 is the sender 30 and the host device 15 is the receiver 35. For either case, in asynchronous mode, the protocol comprises an interlock handshaking routine including the steps of: for each data unit, the sender 30 placing a data unit on the bus 25 and transmitting a request signal to the receiver 35 to notify the receiver 35 that the data unit is on the bus 35, and the receiver 35 latching the data unit from the bus 25 upon receiving the request signal and transmitting an acknowledge signal to the sender 30.

Figure 4:
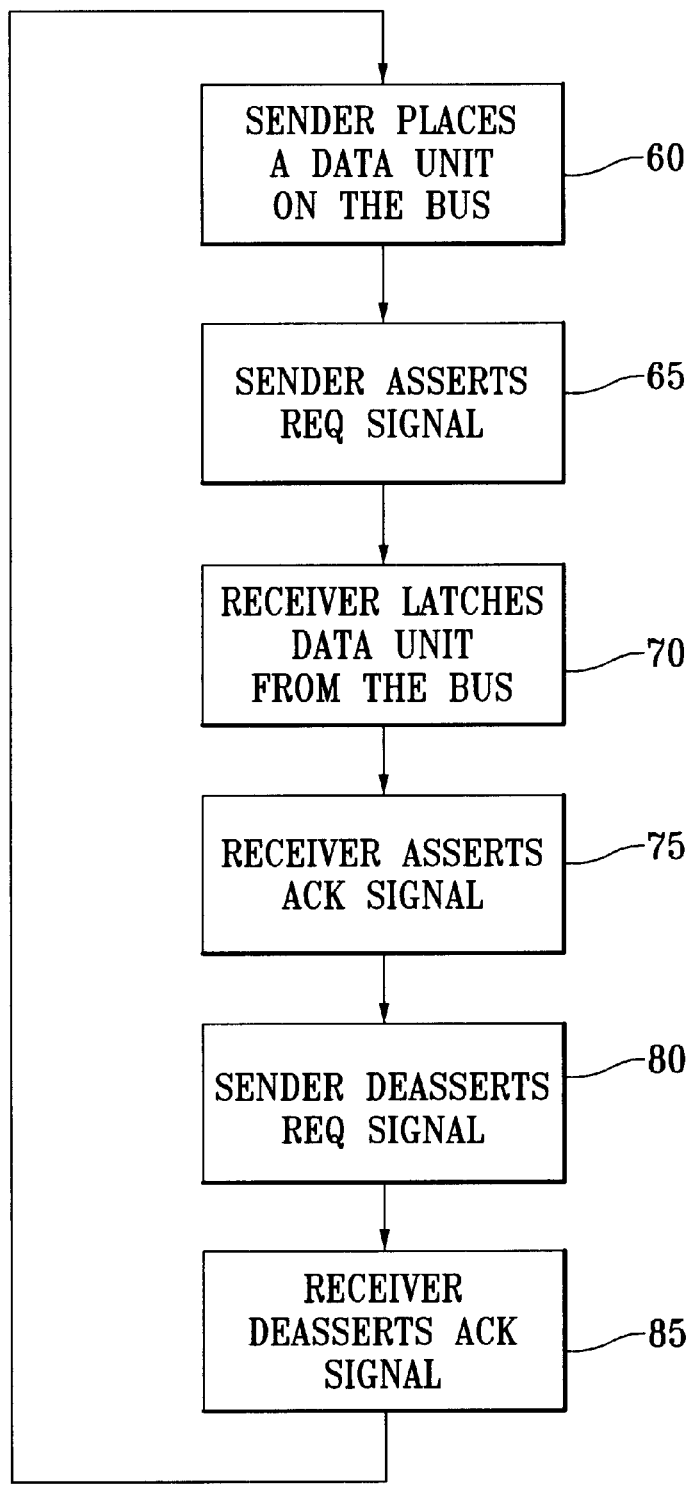
FIG. 4 shows an example flowchart of the method of FIG. 2 for asynchronous data transfer over symmetric bus.

Referring to FIG. 4, specifically, the sender 30 places a data unit on the bus 25 (step 60) and asserts a REQ (request) signal on the bus to notify the receiver 35 that the data unit is on the bus 25 (step 65). Upon sensing the REQ signal asserted, the receiver 35 latches the data unit from the bus 25 (step 70) and asserts an ACK (acknowledge) signal on the bus 25 to notify the sender 30 that the data unit has been received (step 75). Upon sensing the ACK signal asserted, the sender 30 deasserts the REQ signal (step 80), and upon sensing the REQ signal deasserted, the receiver 35 deasserts the ACK signal (step 85). This interlock handshake is repeated for each data unit transmitted from the sender 30 to the receiver 35 in the asynchronous mode.

Figure 5:
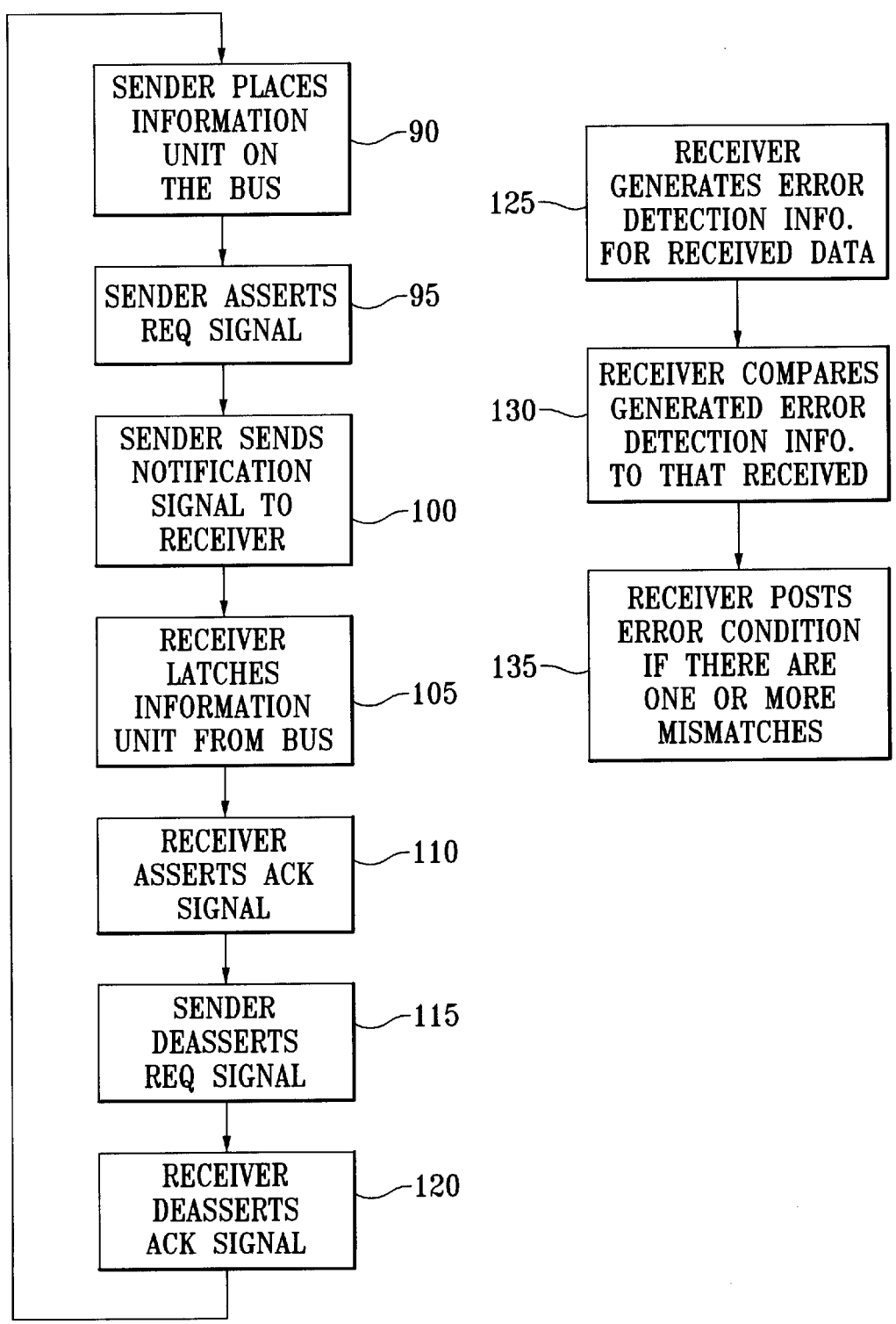
FIG. 5 shows an example flowchart of the method of FIG. 2 for asynchronous error detection information transfer over a symmetric bus.

The sender 30 further generates error detection information units for the transmitted data units. Referring to FIG. 5, after the sender 30 transmits a desired number of data units to the receiver 35, the sender 30 transmits the error detection information units. The error detection information can comprise a predetermined number of bytes, such as four bytes, for one or more bytes of data transmitted from the sender 30 to the receiver 35. The sender 30 and the receiver 35 follow the aforementioned handshake interlock routine for transmission of error detection information units from the sender 30 to the receiver 35 over the bus 25, and places an information unit on the bus 25 (step 90) and asserts a REQ signal on the bus 25 to notify the receiver 35 of the information unit on the bus 25 (step 95). The sender 30 further sends a notification signal to the receiver 35 to indicate to the receiver 35 that the information unit on the bus 25 is error detection information (step 100). Upon sensing the REQ signal asserted, the receiver 35 latches the information unit from the bus 25 (step 105) and asserts an ACK signal to notify the sender 30 that the information unit has been received (step 110). Upon sensing the ACK signal asserted, the sender 30 deasserts the REQ signal (step 115), and the receiver 35 deasserts the ACK signal upon sensing the REQ signal deasserted (step 120). The above steps are repeated for each information unit. The notification signals inform the receiver 35 that the information units received over the bus 25 are error detection information for the data bytes transmitted from the sender 30 to the receiver 35.

As the receiver 35 receives the data units from the bus 25, the receiver 35 generates error detection information for the received data units using the same process used by the sender 30 for generating error detection information (step 125). Thereafter, the receiver 35 compares the error detection information received from the sender 30 to the error detection information generated by the receiver 35 to find any mismatches (step 130). If so, the receiver 35 posts an error condition to indicate an error in the data received from the sender 30 (step 135).

Figure 6:
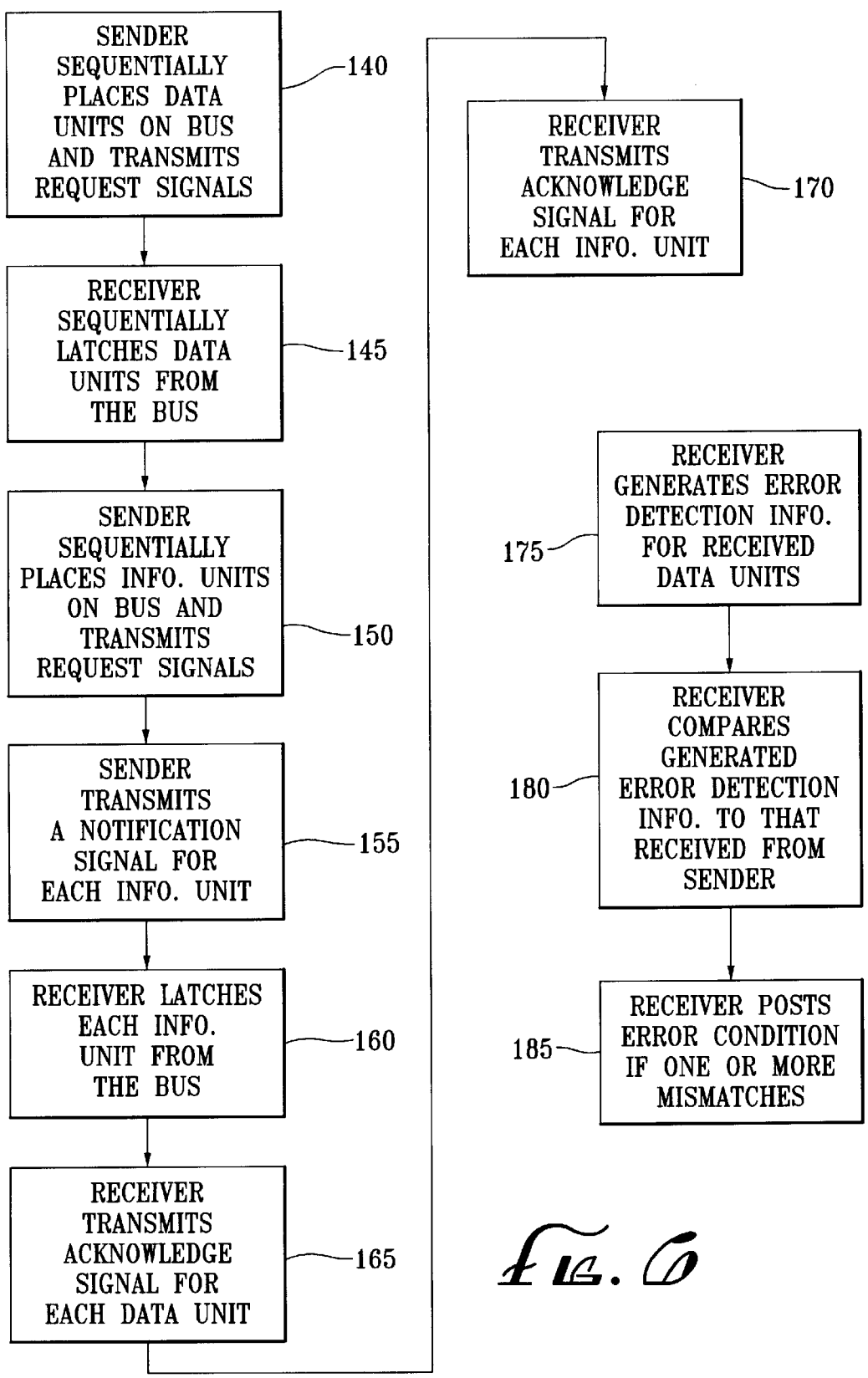
FIG. 6 shows an example flowchart of the method of FIG. 2 for synchronous data and error detection information transfer over a symmetric bus.

Referring to FIG. 6, in synchronous mode, an interlocking handshake is not utilized. Instead, the sender 30 transfers a plurality of data units to the receiver 35, by placing each data unit on the bus 25 and transmitting a request signal to the receiver 35 to notify the receiver 35 of the data unit on the bus 25 (step 140). The sender 30 sequentially transmits the data units without waiting for acknowledge signals from the receiver 35. The receiver 35 sequentially latches each data unit from the bus 25 in response to the corresponding request signal (step 145). The sender 30 further generates error detection information units for the transmitted data units. After transmitting a desired quantity of data units, the sender 30 begins transmitting the error detection information units for the transmitted data units. The sender 30 places each information unit on the bus 25 (step 150) and transmits a request signal and a notification signal to the receiver 35 to notify the receiver 35 that the information unit on the bus 25 is error detection data (step 155). The sender 30 sequentially transmits the information units without waiting for acknowledge signals from the receiver 35. The receiver 35 latches each information unit from the bus 25 in response to the corresponding request signal (step 160). Thereafter, the receiver 35 transmits an acknowledge signal to the sender 30 for each request signal received for the data units (step 165) and for the information units (step 170).

As the receiver 35 receives the data units from the data bus 35, the receiver 35 generates error detection information for the received data units using the same process used by the sender 30 for generating error detection information (step 175). Thereafter, the receiver 35 compares the error detection information received from the sender 30 to the error detection information generated by the receiver 35 to find any mismatches (step 180). If so, the receiver 35 posts an error condition to indicate an error in the data received from the sender 30 (step 185).

Referring to FIG. 1, in another embodiment, the bus 25 can be asymmetric wherein the protocol for data transfer from the peripheral device 20 to the host device 15 is different than that for data transfer from the host device 15 to the peripheral device 20. In the former case the peripheral device 20 is the sender 30 and the host device 15 is the receiver 35, and in the latter case the host device 15 is the sender 30 and the peripheral device 20 is the receiver 35. In this embodiment, data transfer from a peripheral device 20 (sender 30) to the host device 15 (receiver 35) via synchronous and asynchronous transmission protocols, are the same as that for the symmetric bus described above.

For data transfer from the host device 15 to the peripheral device 20, in asynchronous mode, the transmission protocol comprises an interlock handshaking routine including the steps of: the peripheral device 20 transmitting a request signal to the host device 15 requesting data, the host device 15 transmitting data to the peripheral device 20 on the bus 25 in response to the request signal, the peripheral device 20 transmitting a notification signal to the host device 15 requesting error detection information for said data, the host device 15 generating error detection information for said data, and the host device 15 transmitting the error detection information to the peripheral device 20 in response to the notification signal.

Figure 7:
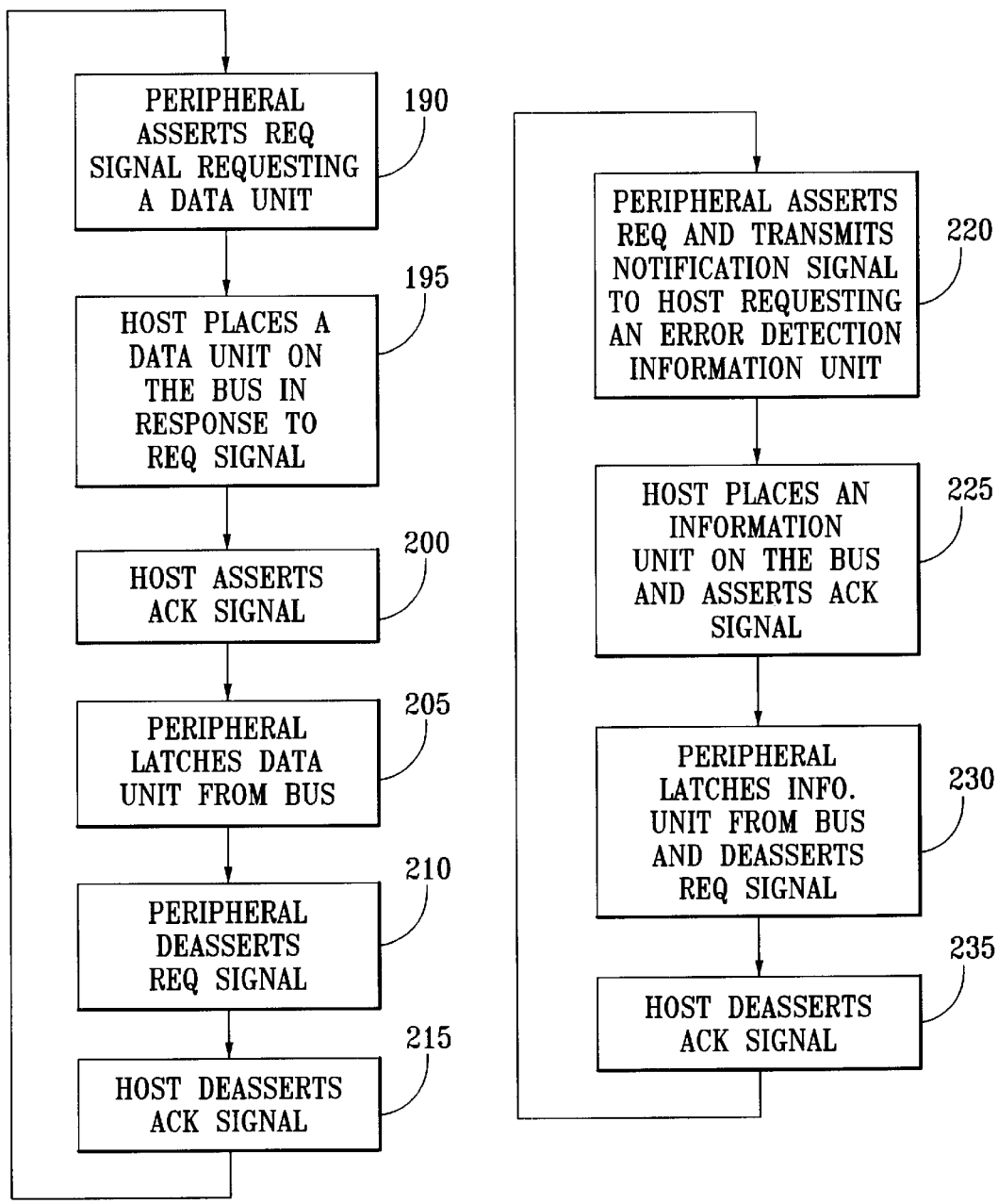
FIG. 7 shows an example flowchart of the method of FIG. 2 for asynchronous data and error detection information transfer over an asymmetric bus.

The aforementioned handshaking steps are repeated for each data unit and for each error detection information unit. Referring to FIG. 7, for each data unit, the peripheral device 20 asserts a REQ signal on the bus 25 to request a data unit from the host 15 (step 190). In response to each REQ signal, the host device 15 places a data unit on the bus 25 (step 195) and asserts an ACK signal on the bus 25 to notify the peripheral device 20 that said data unit is on the bus 25 (step 200). In response to the ACK signal, the peripheral device 20 latches said data unit from the bus 25 (step 205) and deasserts the REQ signal (step 210). When the host device 15 senses the REQ signal deasserted, it deasserts the ACK signal (step 215).

The host device 15 further generates error detection information units for the transmitted data units. After receiving the requested data units, the peripheral device 15 requests the host device 15 to transfer the error detection information units for the transmitted data utilizing the handshaking steps shown in FIG. 6. Specifically, for each information unit, the peripheral device 20 transmits a REQ signal and a notification signal to the host device 15 (step 220). In response to each REQ signal, the host device 15 places an information unit on the bus 25 and asserts an ACK signal one the bus 25 to inform the peripheral device 20 that the information unit is on the bus 25 (step 225). The peripheral device 20 then latches said information unit from the bus 25 upon receiving said ACK signal and deasserts the REQ signal (step 230). The host device 15 then deasserts the ACK signal (step 235).

Preferably, as the peripheral device 20 receives the requested data units, the peripheral device 20 generates error detection information for the received data units. After receiving the error detection information generated by the host device 15, the peripheral device 20 compares the received error detection information to that generated by the peripheral device 20, and posts and error conditions in case or one or more mismatches.

Figure 8:
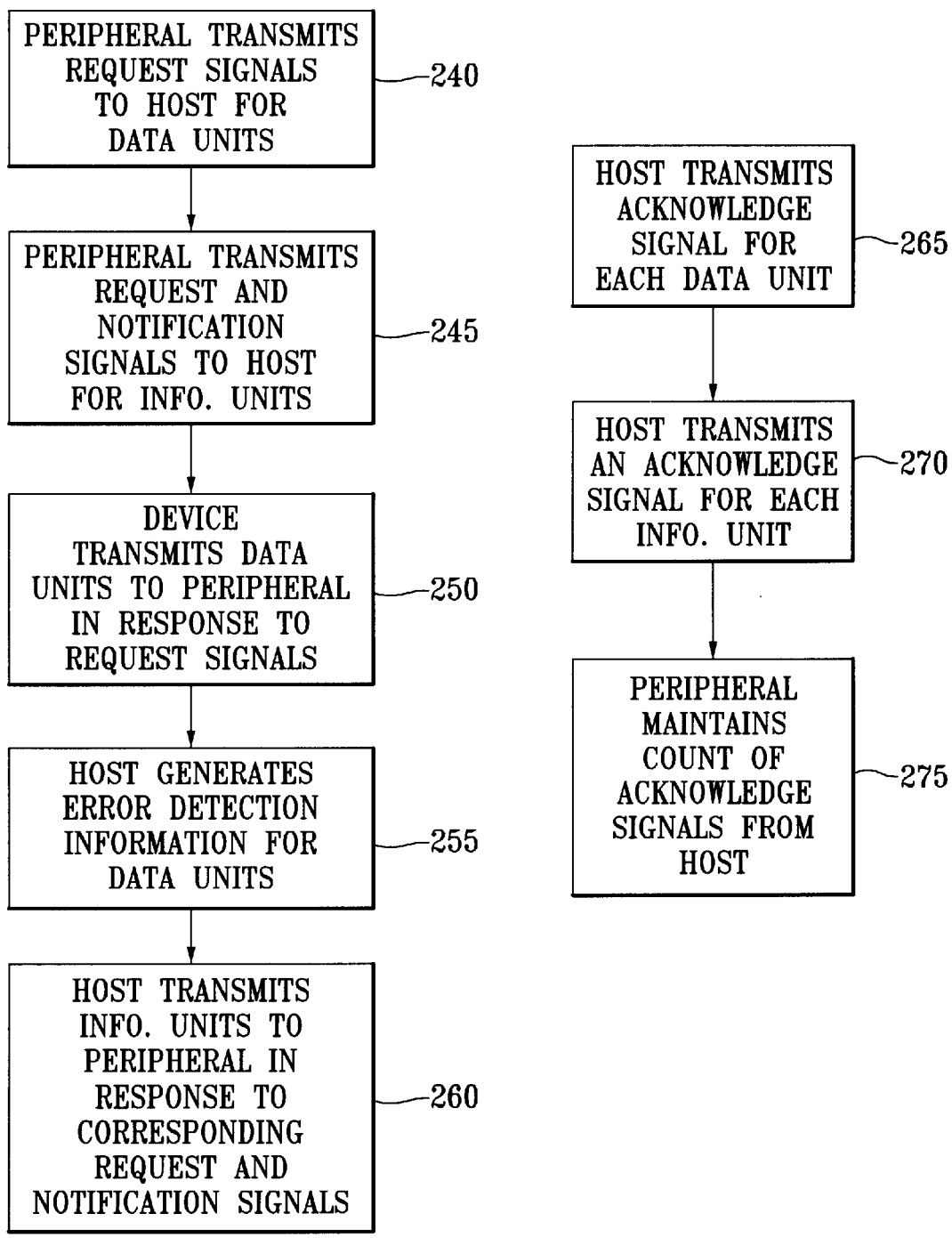
FIG. 8 shows an example flowchart of the method of FIG. 2 for synchronous data and error detection information transfer over an asymmetric bus.

In synchronous mode, an interlocking handshake is not utilized. Referring to FIG. 8, the peripheral device 20 sequentially transmits one or more request signals to the host device 15 requesting one or more data units (step 240), the peripheral device 20 transmits one or more request signals and corresponding notification signals to the host device 15 requesting one or more error detection information units for said data units (step 245), the host device 15 transmits one or more data units to the peripheral device 20 on the bus 25 in response to said request signals for data units (step 250), the host device 15 generates one or more error detection information units for said data units (step 255), and the host device 15 transmits the error detection information units to the peripheral device 15 on the bus 25 in response to said request and notification signals for information units (step 260).

For each data unit transmitted to the peripheral device 20, the host device 15 transmits a corresponding acknowledge signal to the peripheral device 20 (step 265), and for each information unit transmitted to the peripheral device 20, the host device 15 transmits a corresponding acknowledge signal to the peripheral device 20 (step 270). The peripheral device 20 keeps a count of the number of acknowledge signals for identifying the corresponding data and information units based on their number and position in time as received by the peripheral device 20 (step 275).

Preferably, as the peripheral device 20 receives the requested data units, the peripheral device 20 generates error detection information for the received data units. After receiving the error detection information generated by the host device 15, the peripheral device 20 compares the received error detection information to that generated by the peripheral device 20, and posts and error conditions in case or one or more mismatches.

Figure 9:
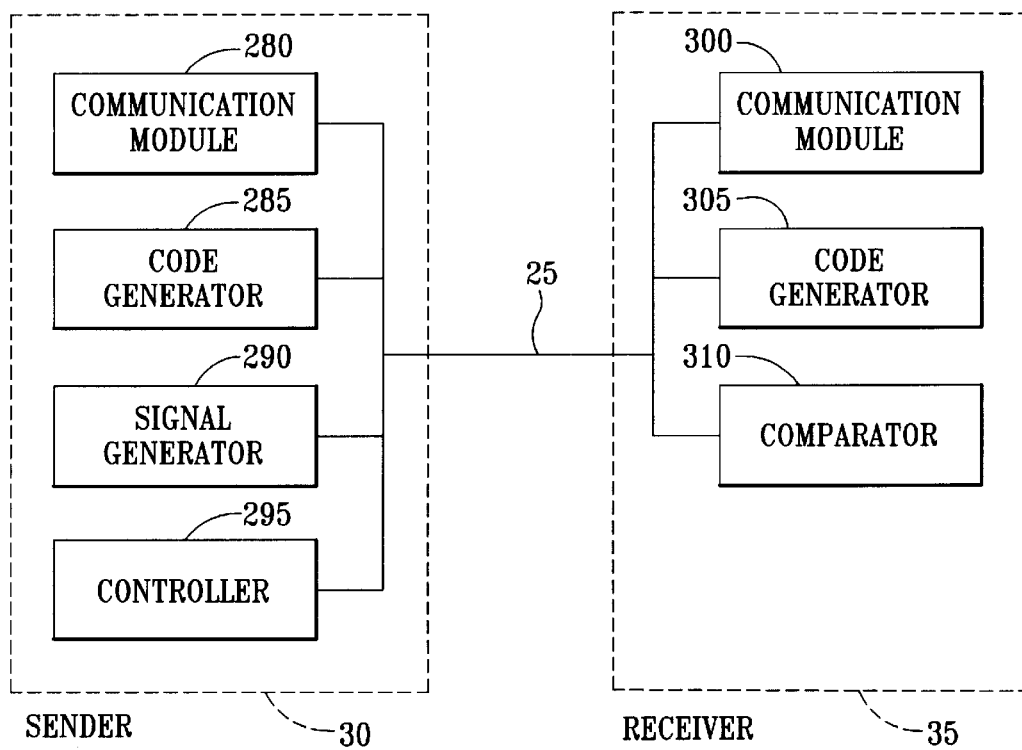
FIG. 9 shows an example data communication system according to another aspect of the present invention.

Referring to the communication system 10 of FIG. 1, the host devices 15 and the peripheral devices 20 are coupled to the bus 25 to selectively control the bus 25 to transmit data and information units via the bus 25. Referring to FIG. 9, in one embodiment of the communication system 15, the bus 25 comprises a symmetric bus as described above, and the sender device 30 comprises: a communication module 280 for handshaking and transmitting data units to the receiver device 35 on the bus 25; a code generator 285 for generating error detection information units for the transmitted data units; a signal generator 290 for transmitting a notification signal to the receiver device 35 to indicate start of error detection information transfer; and a controller 295 for controlling the communication module 280, the code generator 285 and the signal generator 290, for communicating with the receiver device 35 via the bus 25. Whereby, the communication module 280 transmits the data units to the receiver device 35 on the bus 25, the code generator 285 generates error detection information units for the transmitted data units, the signal generator 290 transmits a notification signal to the receiver device 35 to indicate start of error detection information transfer, and the communication module 280 transmits the error detection information units to the receiver device 35 on the bus 25.

The receiver device 35 comprises: a communication module 300 for data transfer over the bus 25; a code generator 305 for generating error detection information for data received from the sender device 35; a comparator 310 for comparing the receiver generated error detection information to error detection information received from the sender device 30, and posting an error condition in case of one or more mismatches.

As discussed above, in asynchronous mode, for each data unit, the communication module 280 of the sender device 30 places a data unit on the bus and transmits a request signal to the receiver device 35 to notify the receiver device 35 of said data unit on the bus 25. In response to each request signal from the sender device 30, the communication module 300 of the receiver device 35 latches a corresponding data unit from the bus 25 and transmits an acknowledge signal to the sender device 30. Similarly, for each information unit: (1) the communication module 280 of the sender device 30 places the information unit on the bus 25 and transmits a request signal to the receiver device 35 to notify the receiver device 35 of said information unit on the bus 25, and (2) the signal generator 290 of the sender device 30 transmits a notification signal to the receiver device 35 to indicate start of the information unit transfer. For each information unit, the communication module 300 of the receiver device 35 latches an information unit from the bus 25 in response to each request signal, and transmits an acknowledge signal to the sender device 30.

As discussed above, in synchronous mode, the communication module 280 of the sender device 30 sequentially places one or more data units on the bus 25 and sequentially transmits one or more corresponding request signals to the receiver device 35 to notify the receiver device 35 of said data units on the bus 25. For each information unit: (1) the signal generator 290 of the sender device 30 transmits a notification signal to the receiver device 35 to indicate start of error detection information transfer and (2) the communication module 280 of the sender device 30 places the information unit on the bus 25 and transmits a request signal to the receiver device 35 to notify the receiver device 35 of said information unit on the bus 25. The communication module 300 of the receiver device 35 latches each data unit from the bus 25 upon receiving a corresponding request signal, and transmits an acknowledge signal to the sender device 30 for each data unit. Similarly, the communication module 300 of the receiver device 35 latches each information unit from the bus 25 upon receiving a corresponding request signal, and transmits an acknowledge signal to the sender device 30 for each information unit.

In one embodiment, the bus 25 can comprise a SCSI bus, the sender device 30 can comprise a target peripheral device 15 on the SCSI bus and the receiver device 35 can comprise an initiator host device 20 on the SCSI bus. Further, the code generator 285 of the sender device 30 can generate a multi-bit cyclic redundancy check (CRC) sum for the transmitted data units.

Figure 10:
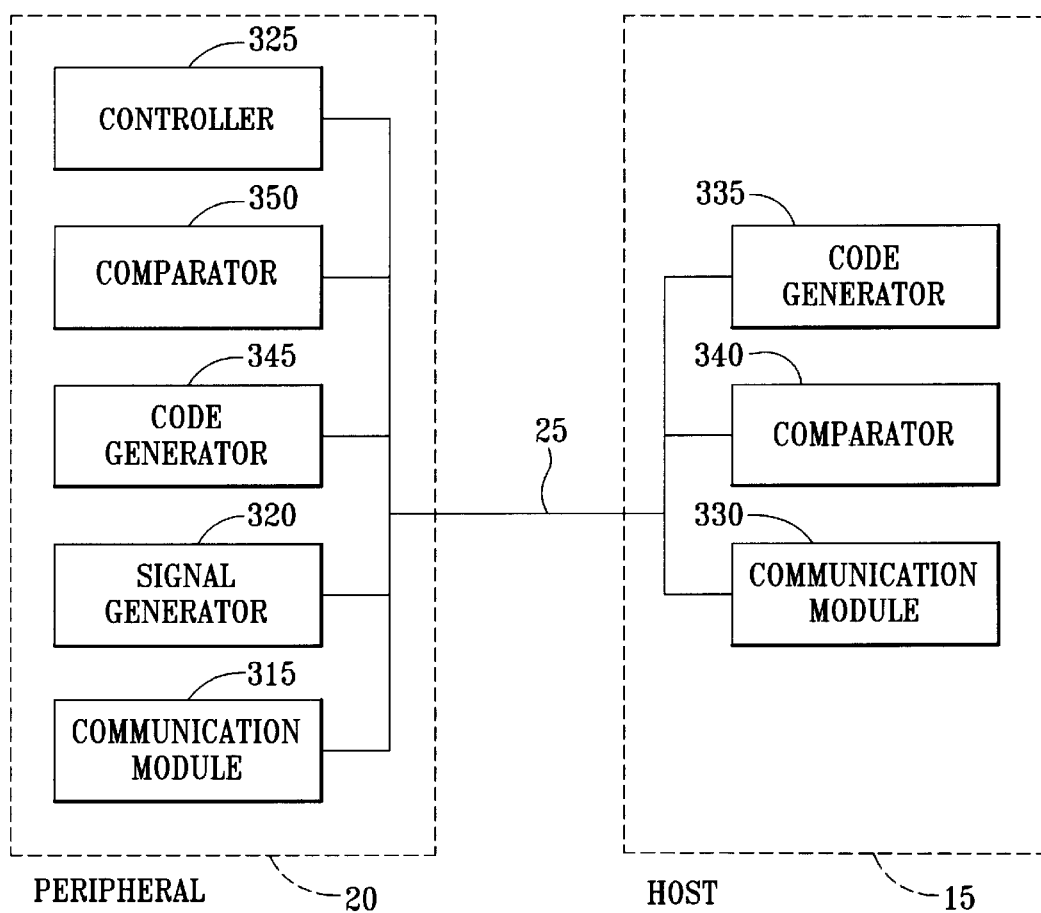
FIG. 10 shows another example data communication system according to yet another aspect of the present invention.

Referring to FIG. 10, in another embodiment of the communication system 10, the bus 25 comprises an asymmetric bus described above, and the peripheral device 20 comprises: a communication module 315 for transmitting request signals to the host device 15 requesting data units; a signal generator 320 for transmitting notification signals to the host device 15 requesting corresponding error detection information units for the data units; and a controller 325 for controlling the communication module 315 and the signal generator 320 for communicating with the host device 15 via the bus 25. The host device 15 comprises: a communication module 330 for transmitting data units and signals to the peripheral device 20 on the bus 25; a code generator 335 for generating error detection information units for the transmitted data units; and a controller 340 for controlling the communication module 330 and the code generator 335 for communicating with the peripheral device 20 via the bus 25.

In synchronous mode, for each data unit, the communication module 315 of the peripheral device 20 transmits a request signal to the host device 15 requesting a data unit, and the signal generator 320 of the peripheral device 20 transmits notification signals to the host device 15 requesting error detection information for the data units. The communication module 330 of the host device 15 transmits a data unit to the peripheral device 20 in response to each request signal, the code generator 335 of the host device 15 generates error detection information for said data units, and the communication module 330 of the host device 15 transmits the error detection information to the peripheral device 20 on the bus 25 in response to said notification signals.

Specifically, in response to each request signal, the communication module 330 of the host device 15 places a data unit on the bus 25 and transmits an acknowledge signal to the peripheral device 20 to notify the peripheral device 20 that the data unit is on the bus 25, and in response to each acknowledge signal, the peripheral device 20 latches said data unit from the bus 25. Further, in response to each notification signal, the communication module 330 of the host device 15 places an information unit on the bus and transmits an acknowledge signal to the peripheral device 20 to notify the peripheral device 20 of said information unit on the bus 25. In response to each acknowledge signal, the peripheral device 20 latches said information unit from the bus 25.

In synchronous mode, the communication module 315 of the peripheral device 20 sequentially transmits one or more request signals to the host device 15 requesting one or more data units, and the signal generator 320 of the peripheral device 20 transmits one or more notification signals to the host device 15 requesting one or more error detection information units for said data units. In response, the communication module 330 of the host device 15 sequentially transmits one or more data units to the peripheral device 20 on the bus 25 in response to said request signals for data units, the code generator 335 of the host device 15 generates error detection information for said data units, and the communication module 330 of the host device 15 transmits the error detection information units to the peripheral device 20 on the bus 25 in response to said notification signals.

For each data unit and for each information unit, the host device 15 transmits an acknowledge signal to the peripheral device 20. The controller 325 of the peripheral device 20 identifies the data units and the information units based on their number and position in time as received by the peripheral device 20. The controller 325 of the peripheral device 20 maintains a count of the number of acknowledge signals from the host device 15, whereby the peripheral device 20 identifies the corresponding data units and the information units based on their number and position in time as received by the peripheral device 20.

The peripheral device 20 further comprises a code generator 35 for generating error detection information for data units received from the host device 15; and a comparator 350 for comparing the error detection information generated by the peripheral device 20 to error detection information received from the host device 15, and posting an error condition in case of one or more mismatches. The code generator 345 of the peripheral device 20 and the code generator 345 of the host device 15 utilize the same process for generating error detection information, such as a multi-bit cyclic redundancy check (CRC) sum for the transmitted and received data. Further, in the above embodiment, the bus 25 can comprises a SCSI bus, the peripheral device 20 can comprise a target device on the SCSI bus and the host device 15 can comprise an initiator device on the SCSI bus.

Figure 11:
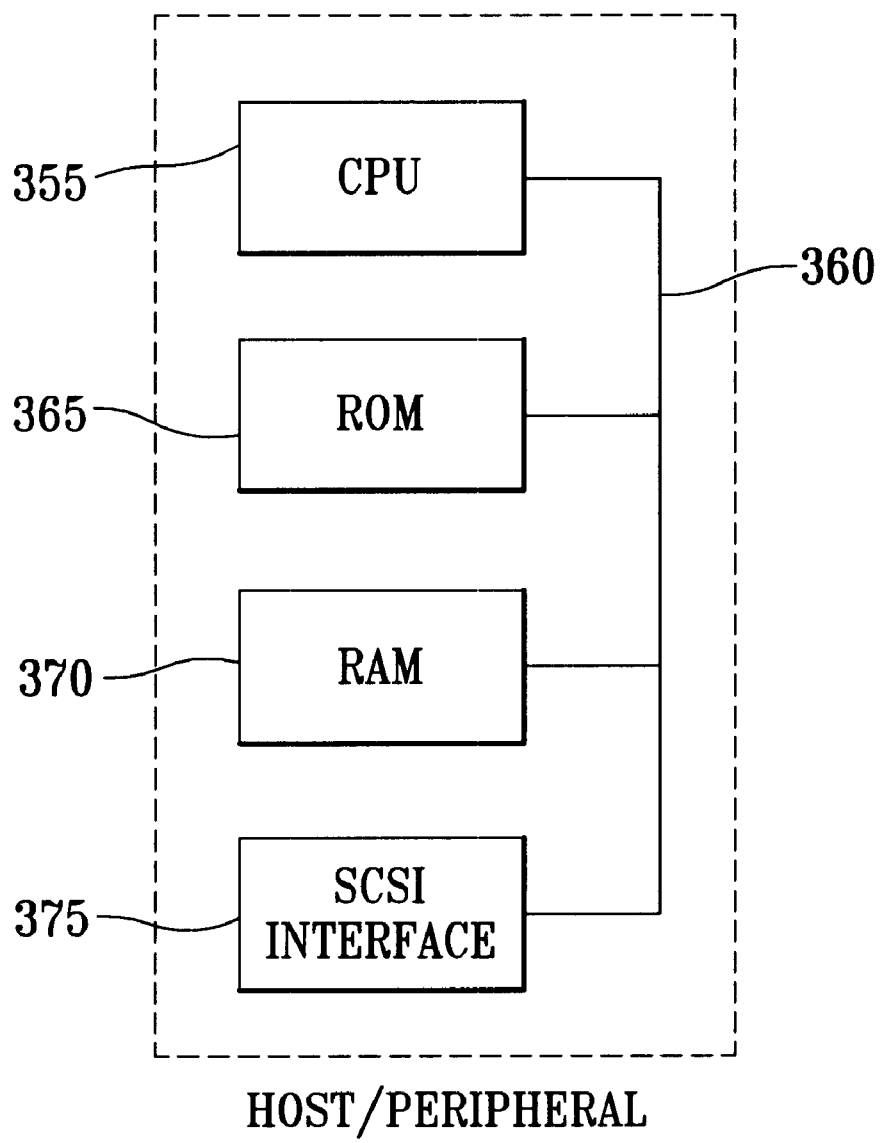
FIG. 11 shows a block diagram of an example architecture for a host device and for a peripheral device according to an aspect of the present invention.

FIG. 11 shows a block diagram of an example architecture for a host initiator device 15 described above, comprising a CPU 355 interconnected via an internal BUS 360 to a ROM 365, a RAM 370, and a SCSI interface 375. The steps performed by the host device 15 can be programmed into the ROM 365 or stored in the RAM 370 to be executed by the CPU 355 for data and error code transfer through the SCSI interface 375. The peripheral target device 20 can have a similar architecture, wherein the steps performed by the peripheral device 20 described above can be programmed into the ROM 365 or stored in the RAM 370 to be executed by the CPU 355 for data and error code transfer through the SCSI interface 375. Other implementations of the host device 15 and the peripheral device 20 are also possible and contemplated by the present invention.

In an example implementation of the present invention, the present invention provides a method of transferring error detection code bytes between an initiator host 15 and a target peripheral device 20 during data transfer via a SCSI bus 25 discussed above, without changing the SCSI bus phase or the speed of the bus operation. The error detection code correction code bytes comprise four byte error detection codes for data transferred between the host device 15 and the peripheral devices 20. The SCSI bus 25 is target driven, wherein the target 20 determines the bus phase, in transferring data from the peripheral device 20 to the host device 15, and in transferring data from the host device 15 to the peripheral device 20.

In this example implementation, the parity bit signal in the SCSI bus 25 is used to implement the aforementioned notification signals to signify transfer of error detection information over the bus 25. As such, the parity bit signal is not used to transmit a parity bit, rather it is used to a transmit a notification signal specifying that the data on the bus 25 is error detection information. Therefore, this embodiment of the present invention can be implemented on any parallel bus which uses parity without changing the physical connections on the bus. The existing physical parity bit connections on the bus are utilized as transmissions means for transmitting notification signals for error detection information via the bus. As such, for example, the peripheral device 20 and the host device 15 utilize and recognize the parity bit signal as a notification signal for transfer of error detection information rather than parity bit information.

Specifically, the parity bit 0 of the SCSI bus 25 is used to transmit the notification signals for transfer of error detection code bytes. For example, when transferring data from the target peripheral device 20 to the initiator host device 15, the target 20 places a data byte on the bus and asserts the REQ signal, with the parity signal deasserted. The initiator 15 latches the data on the leading edge of the REQ signal. The target 20 generates error detection code bytes for the transmitted data. Therefore, the above implementation reuses the existing "Parity for byte 0" signal of the SCSI bus as the signal to indicate either transfer of error detection information when data is transferred from the target peripheral device 20 to the initiator host 15, or to mark the REQ signals whose corresponding ACK signals will then contain error detection information for data transfer from host initiator 15 to target peripheral device 20.

After transferring a desired number of data bytes in this manner, the target 20 sends the error detection code bytes to the initiator 15 by asserting the parity bit signal with each byte of error detection code transferred to specify that the bytes on the bus 25 comprise error detection information, allowing the initiator 15 to distinguish between error detection code bytes and normal data bytes. The error detection code bytes cover all data sent since either the last set of error detection code bytes sent, or if there has not yet been a set of error code bytes sent, for all data transferred since the beginning of the dataphase. To acknowledge receipt of data, the initiator 15 asserts the ACK signal. The initiator 15 also asserts the ACK signal for each of the error detection bytes, acknowledging their receipt. The ACK assertions are not distinguishable from ACK assertions acknowledging data bytes on the bus.

When data is transferred from the initiator 15 to the target 20, data transfer is still started by the target 20 asserting the REQ signal with the parity bit signal deasserted. Each REQ signal informs the initiator 15 that the target 20 is ready to receive a byte of data. When the target 20 wishes the initiator 15 to transfer error detection code bytes covering the previously transferred data, the target 20 asserts the parity bit signal as an error detection code identifier signal along with the REQ signal. The target 20 keeps the parity bit signal asserted for as many REQs as are required for the agreed upon size of the error detection codes. The initiator 15 senses the assertion of the parity bit signals, and "marks" these REQ's as requests for error detection code bytes. When the initiator 15 then sends corresponding ACKs, the initiator 15 sends error detection code bytes instead of the normal data. Since the target 20 sent the REQs, the target keeps track of which ACKs correspond to the error detection bytes.

Figure 12:
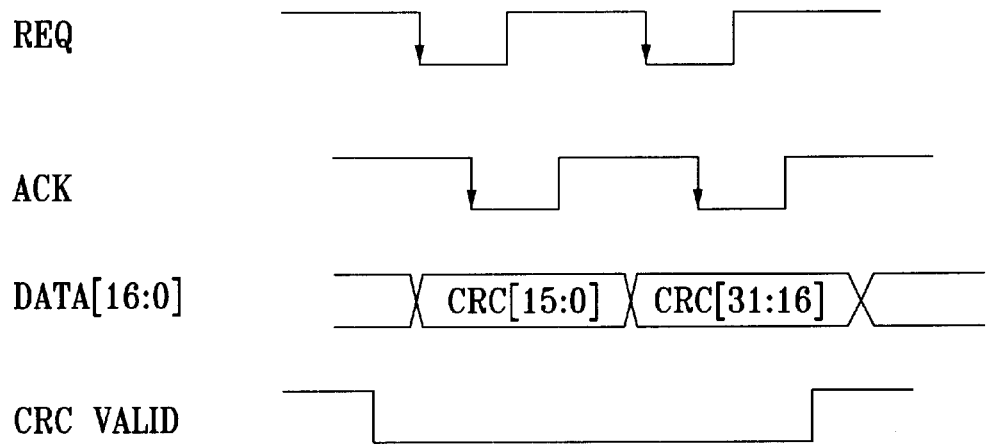
FIG. 12 shows example timing diagrams for asynchronous wide bus transfer of four error code bytes from a target to an initiator, and vice versa, interconnected via a SCSI bus, according to an aspect of the present invention.
Figure 13:
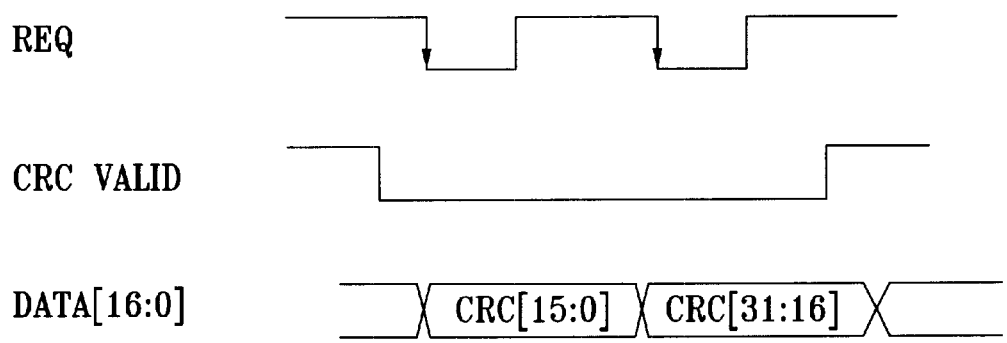
FIG. 13 shows example timing diagrams for synchronous wide bus transfer of four error code bytes from a target to an initiator in a wide SCSI bus with single edge clocking, according to another aspect of the present invention.

FIG. 12 shows timing diagrams for asynchronous wide bus transfer of four error code bytes from the target to the initiator, or vice versa, for a SCSI bus, wherein the data transfer protocol is symmetrical. In FIG. 12, REQ indicates single edge clocking requests for an error code byte, ACK indicates a corresponding acknowledge signal, DATA indicates error code bytes on the bus, and CRC valid indicates the parity bit signal asserted to mark the DATA as error code bytes. FIG. 13 shows timing diagrams for synchronous wide bus transfer of four error code bytes from the target to the initiator in a wide SCSI bus with single edge clocking. And, FIG. 14 shows timing diagrams for synchronous wide bus transfer of four error code bytes from the initiator to the target after N words of data have been transferred.

Although the present invention has been described in considerable detail with regard to the preferred versions thereof, other versions are possible. Therefore, the appended claims should not be limited to the descriptions of the preferred versions contained herein.

What is claimed is:

1. In a data communication system, a method of providing error detection information for data transferred between a sender and a receiver interconnected via a bus, comprising the steps of:

(a) the sender transmitting data to the receiver on the bus;
 (b) the sender generating error detection information for the transmitted data;
 (c) the sender transmitting a notification signal to the receiver to indicate start of error detection information transfer; and
 (d) the sender transmitting the error detection information to the receiver on the bus,
 wherein the bus comprises a parallel bus including a parity bit signal transmission means, and wherein the sender utilizes said transmission means to transmit said notification signal instead of a parity bit signal.

2. The method of claim 1, wherein generating the error detection information further comprises generating a multi-bit cyclic redundancy check (CRC) sum for the transmitted data.

3. The method of claim 1 further comprising the steps of:

(i) the receiver generating error detection information for data received from the sender; and (ii) the receiver comparing the receiver generated error detection information to error detection information received from the sender, and posting an error condition in case of one or more mismatches.

4. The method of claim 3, wherein the sender and the receiver utilize the same process for generating error detection information.

5. In a data communication system, a method of providing error detection information for data transferred between a sender and a receiver interconnected via bus, comprising the steps of:

(a) the sender transmitting data to the receiver on the bus, wherein said data comprises one or more data units, and for each data unit, the sender placing a data unit on the bus and transmitting a request signal to the receiver to signal the receiver of said data unit on the bus, and the receiver latching said data unit from the bus upon receiving said request signal and transmitting and acknowledge signal to the receiver;

(b) the sender generating error detection information for the transmitted data;

(c) sender transmitting a notification signal to the receiver to indicate start error detection information transfer; and (d) the sender transmitting the error detection information to the receiver on the bus.

6. The method of claim 5, wherein said error detection information comprises one or more information units, and wherein step (d) further comprises the steps of: for each information unit, the sender placing an information unit on the bus and transmitting a request signal to the receiver to signal the receiver of said information unit on the bus, and the receiver latching said information unit from the bus upon receiving signal and transmitting an acknowledge signal to the sender.

7. The method of claim 6, wherein step (c) further comprises the steps of: for each information unit, the sender transmitting a notification signal to the receiver to indicate start of the information unit transfer.

8. The method of claim 7, wherein the bus comprises a parallel bus including a parity bit signal transmission means, and wherein the sender utilizes said transmission means to transmit said notification signal instead of a parity bit signal.

9. The method of claim 7, wherein the sender comprises a peripheral device and the receiver comprises a host device.

10. In a data communication system, a method of providing error detection information for data transferred between a sender and a receiver interconnected via a bus, comprising the steps of:

(a) the sender transmitting data to the receiver on the bus, wherein said data comprises one or more data units, and for each data unit, the sender placing a data units on the bus and sequentially transmitting one or more corresponding request signals to the receiver to the signal the receiver of said data units on the bus;

(b) the sender generating error detection information for the transmitted data, wherein said error detection information comprises one or more information units; and (c) for each information unit; the sender transmitting a notification signal to the receiver to indicate start of that information transfer and the sender placing that information unit on the bus and transmitting a request signal to the receiver to signal the receiver of said information on the bus.

11. The method of claim 10 further comprising the steps of the receiver latching each data unit from the bus upon receiving a corresponding request signal, and the receiver transmitting an acknowledge signal to the sender for each data unit.

12. The method of claim 11 further comprising the steps of the receiver latching each information unit from the bus upon receiving a corresponding request signal, and the receiver transmitting an acknowledge signal to the sender for each information unit.

13. The method of claim 12, wherein the bus comprises a parallel bus including a parity bit signal transmission means, and wherein the sender utilizes said transmission means to transmit said notification signal instead of a parity bit signal.

14. The method of claim 12, wherein the sender comprises a peripheral device and the receiver comprises a host device.

15. In a data communication system, a method of providing error correction information for data transferred from a host device to a peripheral device interconnected via a bus, comprising the steps of:

(a) the peripheral device transmitting a request signal to the host device requesting data;

(b) the host device transmitting data to the peripheral device on the bus in response to the request signal;

(c) the peripheral device transmitting a notification signal to the host device requesting error detection information for said data;

(d) the host device generating error detection information for said data; and (e) the host device transmitting the error detection information to the peripheral device on the bus in response to said notification signal.

16. The method of claim 15, wherein said data comprises one or more data units, and wherein:

(i) step (a) comprises the peripheral device transmitting a request signal to the host device for each data unit; and (ii) step (b) comprises, in response to each request signal, the host device placing a data unit on the bus and transmitting an acknowledge signal to the peripheral device to notify the peripheral device of said data unit on the bus, and the peripheral device latching said data unit from the bus upon receiving said acknowledge signal.

17. The method of claim 16, wherein said error detection information comprises one or more information units, and wherein:

(i) step (c) comprises the peripheral device transmitting a notification signal to the host device for each information unit; and (ii) step (e) comprises, in response to the notification signal for each information unit, the host placing an information unit on the bus and transmitting an acknowledge signal to the peripheral device to notify the peripheral device of said information unit on the bus, and the peripheral device latching said information unit from the bus upon receiving said acknowledge signal.

18. The method of claim 15, wherein the bus comprises a parallel bus including a parity bit signal transmission means, and wherein the peripheral device utilizes said transmission means to transmit said notification signals instead of a parity bit signals.

19. The method of claim 15, wherein generating the error detection information further comprises generating a multi-bit cyclic redundancy check (CRC) sum for the transmitted data.

20. The method of claim 15 further comprising the steps of:

(i) the peripheral device generating error detection information for data received from the host device; and (ii) the peripheral device comparing the error detection information generated by the peripheral device to error detection information received from the host device, and posting an error condition in case of one or more mismatches.

21. The method of claim 20, wherein the peripheral device and the host device utilize the same process for generating error detection information.

22. In a data communication system, a method of providing error correction information for data transferred from a host device to a peripheral device interconnected via a bus, comprising the steps of:

(a) the peripheral device transmitting one or more request signals to the host device requesting one or more data units;

(b) the peripheral device transmitting one or more notification signals to the host device requesting one or more error detection information units for said data units;

(c) the host device transmitting one or more data units to the peripheral device on the bus in response to said request signals for data units;

(d) the host device generating one or more error detection information units for said data units; and (e) the host device transmitting the error detection information units to the peripheral device on the bus in response to said notification signals for information units.

23. The method of claim 22, wherein:

(i) step (c) further comprises, for each data unit the host device transmitting an acknowledge signal to the peripheral device;

(ii) step (e) further comprises, for each information unit the host device transmitting an acknowledge signal to the peripheral device; and (iii) the method further the steps of the peripheral device identifying the data units and the information units based on their number and position in time as received by the peripheral device.

24. The method of claim 23, wherein step (iii) further comprises the peripheral device maintaining a count of the number of acknowledge signals from the host, whereby the peripheral device identifies the corresponding data units and the information units based on their number and position in time as received by the peripheral device.

25. The method of claim 24, wherein the bus comprises a parallel bus including a parity bit signal transmission means, and wherein the peripheral device utilizes said transmission means to transmit said notification signal instead of a parity bit signal.

26. The method of claim 22, wherein step (d) comprises generating a multi-bit cyclic redundancy check (CRC) sum for the transmitted data.

27. The method of claim 22 further comprising the steps of:

(i) the peripheral device generating error detection information for data received from the host device; and (ii) the peripheral device comparing the error detection information generated by the peripheral device to error detection information received from the host device, and posting an error condition in case of one or more mismatches.

28. The method of claim 27, wherein the peripheral device and the host device utilize the same process for generating error detection information.

29. In a data communication system including a system bus, at least one sender device and at least one receiver device, each of the devices coupled to the bus for selectively controlling the bus to transmit data via the bus, the sender device comprising:

(a) a first communication module for transmitting data units to the receiver device on the bus;

(b) a first code generator for generating error detection information units for the transmitted data units; and (c) a first signal generator for transmitting a notification signal to the receiver device to indicate start of error detection information transfer, wherein the bus comprises a parallel bus including a parity bit signal transmission means, and wherein the signal generator utilizes said transmission means to transmit said notification signal instead of a parity bit signal; and (d) a first controller for controlling the first communication module, the first code generator and the first signal generator, for communicating with the receiver device via the bus, whereby the first communication module transmits the data units to the receiver device on the bus, the first code generator generates error detection information units for the transmitted data units, the first signal generator transmits a notification signal to the receiver device to indicate start of error detection information transfer, and the first communication module transmits the error detection information units to the receiver device on the bus.

30. The data communication system of claim 29, wherein the first code generator generates a multi-bit cyclic redundancy check (CRC) sum for the transmitted data units.

31. The data communication of claim 30, wherein the system bus comprises a SCSI bus including said parity bit signal transmission means, the sender device comprises a target peripheral device on the SCSI bus, the receiver device comprises an initiator host device on the SCSI bus, and the peripheral device utilizes said transmission means to transmit said notification signal instead of a parity bit signal.

32. The data communication system of claim 29, wherein the receiver device comprises:

(a) a second code generator for generating error detection information for data received from the sender device; and (b) a comparator for comparing the receiver generated error detection information to error detection information received from the sender device, and posting an error condition in case of one or more mismatches.

33. The data communication system of claim 32, wherein the second code generator and the first code generator utilize the same process for generating error detection information.

34. In a data communication system including a system bus, at least one sender device and at least one receiver device, each of the devices coupled to the bus for selectively controlling the bus to transmit data via the bus, wherein:

the sender device comprises:

(a) a first communication module for transmitting data units to the receiver device on the bus, wherein for each data unit, the first communication module places a data unit on the bus and transmits a request signal to the receiver to notify the receiver of said data unit on the bus;

(b) a first code generator for generating error detection information units for the transmitted data units; and (c) a first signal generator for transmitting a notification signal to the receiver device to indicate start of error detection information transfer;

(d) a first controller for controlling the first communication module, the first code generator and the first signal generator, for communicating with the receiver device via the bus, whereby the first communication module transmits the data units to the receiver device on the bus, the first code generator generates error detection information units for the transmitted data units, the first signal generator transmits a notification signal to the receiver device to indicate start of error detection information transfer, and the first communication module transmits the error detection information units to the receiver device on the bus; and the receiver comprises a second communication module for data communication, wherein, in response to each request signal from the sender device, the second communication module latches a corresponding data unit from the bus and transmits an acknowledge signal to the sender device.

35. The data communication system of claim 34, wherein:
(a) for each data unit: (1) the first communication module places the information unit on the bus and transmits a request signal to the receiver device to notify the receiver device of said information unit on the bus, and (2) the first signal generator transmits a notification signal to the receiver to indicate start of the information unit transfer; and
(b) the second communication module latches an information unit from the bus in response to each request signal, and transmits and acknowledge signal to the sender device.

36. The data communication system of claim 35, wherein: (i) the system bus comprises a SCSI bus including a parity bit signal transmission means, (ii) the sender device comprises a target peripheral device on the SCSI bus, (iii) the receiver device comprises an initiator host device on the SCSI bus and (iv) the peripheral device utilizes said transmission means to transmit said notification signal instead of a parity bit signal.

37. In a data communication system including a system bus, at least one sender device and at least one receiver device, each of the devices coupled to the bus for selectively controlling the bus to transmit data via the bus, the sender device comprising:
(a) a first communication module for transmitting data units to the receiver device on the bus wherein the first communication module sequentially places one or more data units on the bus and sequentially transmits one or more corresponding request signals to the receiver device to notify the receiver device of said data units on the bus;
(b) a first code generator for generating error detection information units for the transmitted data units;
(c) a first signal generator for transmitting a notification signal to the receiver device to indicate start of error detection information transfer wherein for each information unit: (1) the first signal generator transmits a notification signal to the receiver to indicate start of error detection information transfer and (2) the first communication module places the information unit on the bus and transmits a request signal to the receiver device to notify the receiver device of said information unit on the bus; and
(d) a first controller for controlling the first communication module, the first code generator and the first signal generator, for communicating with the receiver device via the bus, whereby the first communication module transmits the data units to the receiver device on the bus, the first code generator generates error detection information units for the transmitted data units, the first signal generator transmits a notification signal to the receiver device to indicate start of each information unit transfer, and the first communication module transmits the error detection information units to the receiver device on the bus.

38. The data communication system of claim 37 wherein the receiver device comprises a second communication module for latching each data unit from the bus upon receiving a corresponding request signal, and transmitting an acknowledge signal to the sender device for each data unit.

39. The data communication system of claim 38 wherein the second communication module latches each information unit from the bus upon receiving a corresponding request signal, and transmits an acknowledge signal to the sender device for each information unit.

40. The data communication system of claim 39, wherein the system bus comprises a SCSI bus including a parity bit signal transmission means, the sender device comprises a target peripheral device on the SCSI bus, the receiver device comprises an initiator host device on the SCSI bus, and the peripheral device utilizes said transmission means to transmit said notification signals instead of parity bit signals.

41. In a data communication system including a system bus, a host device and a peripheral device, each of the devices coupled to the bus for selectively controlling the bus to transmit data via the bus, wherein:
the peripheral device comprises:
(a) a first communication module for transmitting request signals to the host device requesting data units;
(b) a first signal generator for transmitting notification signals to the host device requesting corresponding error detection information units for the data units; and
(c) a first controller for controlling the first communication module and the first signal generator for communicating with the host device via the bus, whereby: (1) for each data unit, the first communication module transmits a request signal to the host device requesting a data unit, and (2) the first signal generator transmits notification signals to the host device requesting error detection information for the data units; and
the host device comprises:
(a) a second communication module for transmitting data units and signals to the peripheral device on the bus;
(b) a second code generator for generating error detection information units for the transmitted data units; and
(c) a second controller for controlling the second communication module and the second code generator for communicating with the peripheral device via the bus, whereby: (1) the second communication module transmits a data unit to the peripheral device in response to each request signal, (2) the second code generator generates error detection information for said data units, and (3) the second communication module transmits the error detection information to the peripheral device on the bus in response to said notification signals.

42. The data communication system of claim 41, wherein: (a) in response to each request signal, the second communication module places a data unit on the bus and transmits an acknowledge signal to the peripheral device to notify the peripheral device of said data unit on the bus, and (b) in response to each acknowledge signal, the peripheral device latches said data unit from the bus.

43. The data communication system of claim 42, wherein: (a) in response each notification signal, the second communication module places an information unit on the bus and transmits an acknowledge signal to the peripheral device to notify the peripheral device of said information unit on the bus, and (b) in response to each acknowledge signal, the peripheral device latches said information unit from the bus.

44. The data communication system of claim 41, wherein the system bus comprises a SCSI bus including a parity bit signal transmission means, the peripheral device comprises a target device on the SCSI bus, the host device comprises an initiator device on the SCSI bus, and the peripheral device utilizes said transmission means to transmit said notification signals instead of parity bit signals.

45. The data communication system of claim 41, wherein the code generator generates a multi-bit cyclic redundancy check (CRC) sum for the transmitted data.

46. The data communication system of claim 41, wherein the peripheral device further comprises:
 (i) a second code generator for generating error detection information for data units received from the host device; and
 (ii) a comparator for comparing the error detection information generated by the peripheral device to error detection information received from the host device, and posting an error condition in case of one or more mismatches.

47. The data communication system of claim 46, wherein the first code generator and the second code generator utilize the same process for generating error detection information.

48. In a data communication system including a system bus, a peripheral device and a host device, each of the devices coupled to the bus for selectively controlling the bus and transmitting data via the bus, wherein:
 the peripheral device comprises:
  (a) a first communication module for transmitting requests signals to the host device requesting data units;
  (b) a first signal generator for transmitting notification signals to the host device requesting corresponding error detection information units for the data units; and
  (c) a first controller for controlling the first communication module and the first signal generator for communication with the host device via the bus, whereby: (1) the first communication module sequentially transmits one or more request signals to the host device requesting one or more data units, and (2) the first signal generator transmits one or more notification signals to the host device requesting one or more error detection information units for said data units; and
 the host device comprises:
  (a) a second communication module for transmitting data units and signals to the peripheral device on the bus;
  (b) a second code generator for generating error detection information units for the transmitted data units; and
  (c) a second controller for controlling the second communication module and second the code generator for communicating with the peripheral device via the bus, whereby: (1) the second communication module sequentially transmits one or more data units to the peripheral device on the bus in response to said request signals for data units, (2) the second code generator generates error detection information for said data units, and (3) the second communication module transmits the error detection information units to the peripheral device on the bus in response to said notification signals.

49. The data communication system of claim 48, wherein: (a) for each data unit, the host device transmits an acknowledge signal to the peripheral device, (b) for each information unit, the host device transmits an acknowledge signal to the peripheral device, and (c) the first controller identifies the data units and the information units based on their number and position in time as received by the peripheral device.

50. The data communication system of claim 49, wherein the first controller maintains a count of the number of acknowledge signals from the host device, whereby the peripheral device identifies the corresponding data units and the information units based on their number and position in time as received by the peripheral device.

51. The data communication system of claim 50, wherein the bus comprises a SCSI bus including a parity bit signal transmission means, and the peripheral device utilizes said transmission means to transmit said notification signals instead of parity bits signals.

52. The data communication system of claim 48, wherein the second code generator generates a multi-bit cyclic redundancy check (CRC) sum for the transmitted data units.

53. The data communication system of claim 48, wherein the peripheral device further comprises:
 (a) a first code generator for generating error detection information for data units received from the host device; and
 (b) a comparator for comparing the error detection information generated by the peripheral device to error detection information received from the host device, and posting an error condition in case of one or more mismatches.

54. The data communication system of claim 53, wherein the first code generator and the second code generator utilize the same process for generating error detection information.

\* \* \* \* \*